_(12)_ United States Patent
Takayama et al.

(10) Patent No.: US 8,901,449 B2
(45) Date of Patent: Dec. 2, 2014

(54) SPOT WELDING SYSTEM AND DRESSING DETERMINATION METHOD

(75) Inventors: Yuusuke Takayama, Yamanashi (JP); Hiromitsu Takahashi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 481 days.

(21) Appl. No.: 13/050,267

(22) Filed: Mar. 17, 2011

(65) Prior Publication Data

US 2011/0240605 A1 Oct. 6, 2011

(30) Foreign Application Priority Data

Apr. 5, 2010 (JP) ................................. 2010-087100

(51) Int. Cl.
*B23K 9/28* (2006.01)
*B23K 11/36* (2006.01)
*B23K 11/31* (2006.01)
*B23K 11/30* (2006.01)
*B23K 11/11* (2006.01)

(52) U.S. Cl.
CPC .............. *B23K 11/115* (2013.01); *B23K 11/36* (2013.01); *B23K 11/315* (2013.01); *B23K 11/3063* (2013.01)
USPC ........................................................ 219/86.1

(58) Field of Classification Search
USPC ............. 83/27, 28, 31, 36, 43, 390, 569, 613, 83/698.11, 745, 884, 885, 886, 88, 7, 922, 83/923; 901/27, 28, 29, 14, 15, 16, 17, 40, 901/41; 30/310; 156/510; 219/86.1–86.25, 219/86.33–86.7, 119, 108, 109; 451/5, 8, 9, 451/180, 262; 382/141, 286, 291, 209; 348/86, 87, 90
See application file for complete search history.

(56) References Cited

U.S. PATENT DOCUMENTS 6,232,572 B1 * 5/2001 Kanjo ........................... 219/110
2004/0186627 A1 9/2004 Watanabe et al.

(Continued)

FOREIGN PATENT DOCUMENTS

CN 101224519 A 7/2008
EP 0569831 A2 11/1993

(Continued)

OTHER PUBLICATIONS

English Language Translation of JP08-243883 (Cited in IDS by Applicant).*

(Continued)

*Primary Examiner* — Dana Ross
*Assistant Examiner* — Jospeh Iskra
(74) *Attorney, Agent, or Firm* — Lowe Hauptman & Ham, LLP

(57) ABSTRACT

A spot welding system including a welding gun with an openable/closable electrode pair; and a dressing determination device determining a quality of a shaping process applied to an electrode of the electrode pair. The dressing determination device includes a visual sensor obtaining an image of the electrode, identifying a base and a tip of the electrode on the image and measuring a distance between the base and the tip on the image, by image processing; a visual sensor control section allowing the visual sensor to measure the distance immediately before and after the shaping process is performed; a cut amount calculation section calculating a difference between the distances measured by the visual sensor immediately before and after the shaping process is performed, as a cut amount of the electrode; and a cut amount judgment section judging whether the calculated cut amount is within a predetermined acceptable range.

5 Claims, 4 Drawing Sheets

(56) References Cited

U.S. PATENT DOCUMENTS

| | | | |
|---|---|---|---|
| 2008/0190899 A1* | 8/2008 | Sugahara et al. | 219/86.25 |
| 2009/0289040 A1* | 11/2009 | Boyd | 219/86.41 |

FOREIGN PATENT DOCUMENTS

| | | | |
|---|---|---|---|
| EP | 1964639 | * | 9/2008 |
| JP | 1-172484 U1 | | 12/1989 |
| JP | 07-080659 A1 | | 3/1995 |
| JP | 07-308786 A1 | | 11/1995 |
| JP | 08243883 A | | 9/1996 |
| JP | 08-257876 A1 | | 10/1996 |
| JP | 3289508 | | 6/2002 |
| JP | 2002219581 | | 8/2002 |
| JP | 2002-273575 A1 | | 9/2002 |
| JP | 2007-242948 | * | 9/2007 |
| JP | 2007242948 A | | 9/2007 |
| JP | 2007-268538 | * | 10/2007 |
| JP | 2007268538 A | | 10/2007 |
| JP | 2007-283368 A1 | | 11/2007 |
| JP | 2008-254069 A1 | | 10/2008 |
| JP | 2008-292429 A1 | | 12/2008 |
| JP | 2008-292443 A1 | | 12/2008 |
| JP | 2009-090316 A1 | | 4/2009 |
| JP | 2010-051997 A1 | | 3/2010 |
| TW | 200802675 A | | 1/2008 |

OTHER PUBLICATIONS

JP Office Action for 2010-087100 dated Sep. 6, 2011.
Japanese Office Action for Application No. JP2010-087100 mailed Feb. 7, 2012.
Office Action issued in Chinese application No. 201110085790.4.
Office Action mailed Nov. 4, 2013 corresponds to Chinese patent application No. 201110085790.4.

* cited by examiner

SPOT WELDING SYSTEM AND DRESSING DETERMINATION METHOD

RELATED APPLICATIONS

The present application is based on, and claims priority from, Japanese Application Number 2010-087100, filed Apr. 5, 2010, the disclosure of which is hereby incorporated by reference herein in its entirety.

BACKGROUND OF THE INVENTION

1. Field of the Invention

The present invention relates to a spot welding system. The present invention also relates to a dressing determination method in the spot welding system.

2. Description of the Related Art

In a spot welding system, with respect to at least one pair of electrodes (hereinafter referred to as an electrode pair) provided in a welding gun, a shaping or forming process (typically referred to as a dressing) for restoring the surface of each electrode worn or deformed due to the repetition of a spot welding process to a proper shape is performed at required periods. In this connection, various dressing determination methods for determining the quality of the shaping process applied to the electrodes of the welding gun.

For example, Japanese Unexamined Patent Publication (Kokai) No. 2002-219581 (JP2002-219581A) discloses "method and device for detecting an abnormality in a dressing of an electrode tip provided in a welding gun" (Paragraph No. 0001). JP2002-219581A describes that "After a welding operation is performed by electrode tips for a predetermined number of times, a dressing operation is performed for the electrode tips, and thereafter, the wearing amount of the electrode tips is detected. Next, it is judged whether or not the detected wearing amount is within a reference wearing range defined based on a wearing amount of the electrode tips detected before the dressing operation is performed. Then, if the detected wearing amount is not within the reference wearing range, it is detected that the abnormality of the dressing occurs in the electrode tips." (Paragraph No. 0008), "In response to a command from controller 14, electric welding gun 18 is driven so that electrode tips 20a, 20b are tentatively struck on each other before starting the welding operation (step S2)." (Paragraph No. 0023), "Encoder 54 disposed at a top of servo motor 28 detects a rotational angle of rotor 38 constituting the servo motor 28, and thereby detects a stroke of electrode tip 20a. Pulse signals from encoder 54 are converted to positional data 66 in encoder interface 64, and positional data 66 is sent to CPU 60 and tip position control section 68. In CPU 60, input positional data 66 is stored in tip position initial state storage section 80 as the initial positional states of electrode tips 20a, 20b (step S3)." (Paragraph No. 0025), "After the dressing operation is finished, similarly to the above, electrode tips 20a, 20b are tentatively struck on each other (step S7) and, based on the pulse signals from encoder 54, the wearing amount of electrode tips 20a, 20b are calculated (step S8)." (Paragraph No. 0028), and "It is judged whether or not a difference between wearing amount T1 of electrode tip 20a detected in a wearing amount detection (K1) after the dressing operation (D1) and wearing amount T2 of electrode tip 20a detected in a wearing amount detection (Ka) before the dressing operation (or an initial state detection (K0)) is within a predetermined reference wearing range." (Paragraph No. 0031).

Japanese Patent No. 3289508 (JP3289508B) discloses "A welding tip management device attached to a welding gun" (Paragraph No. 0001). JP3289508B describes that "As illustrated in FIG. 1(B), there may be provided an initial tip diameter measurement means "f" for measuring a tip diameter of a welding tip after tip dressing, an initial tip diameter determination means "g" for comparing the tip diameter of the welding tip after tip dressing to upper and lower limit values and making a determination, a tip dressing re-instruction means "h" for instructing a repetitive tip dressing when it is judged that the tip diameter is not within a range between the upper and lower limit values, and a tip dresser abnormality determination means "i" for determining that there is abnormality of the tip dresser when the tip diameter is not within the above range even if the tip dressing is repeated for a predetermined number of times." (Paragraph No. 0008), "As illustrated in FIG. 1(C), there may be provided a tip length measurement means "j" for measuring a length of the welding tip, and a tip exchange instruction means "k" for instructing to exchange the welding tip when the length of the welding tip becomes less than the lower limit value. Further, as illustrated by dotted lines in FIG. 1(B), there may be provided a tip length measurement means "j" for measuring a length of the welding tip, and an upper and lower limit value change means "m" for changing the upper limit value and the lower limit value for comparison in the initial tip diameter determination means "g" depending on the length of the welding tip." (Paragraph No. 0009), "After the tip dressing, laser line sensor 9 measures the tip diameter (initial tip diameter) D of the welding tip in step 59. Then, in step 60, the measured initial tip diameter D is compared to upper limit value D0max and lower limit value D0min to determine whether the initial tip diameter D is within these values (D0min≤D≤D0max) or not." (Paragraphs No. 0036), "After the tip dressing and the measurement, the process proceeds to step 65. In step 65, laser line sensor 9 measures the length L of the welding tip (the tip length). In step 66, the measured tip length L is compared to a predetermined lower limit value Lmin. If L<Lmin, the process proceeds to step 67 where an alarm is output to instruct the exchange of the welding tip" (Paragraph No. 0040).

In the conventional dressing determination method in a spot welding system, the quality of a shaping or forming process is determined by calculating the wearing amount of an electrode based on the pulse signals of the encoder of a welding gun before and after the shaping process for an electrode surface is performed, or by measuring the tip diameter and/or length of an electrode by using a laser line sensor after the shaping process for an electrode surface is performed. In these methods, if the pulse signals of the encoder do not accurately represent the position of the electrode due to, e.g., vibrations generating when the electrode is driven, or if the tip diameter or length of the electrode includes errors due to, e.g., deviation of the attachment position of the electrode with respect to the welding gun, the reliability of determination results is deteriorated.

SUMMARY OF THE INVENTION

The present invention provides, as one aspect, a spot welding system comprising a welding gun provided with an electrode pair capable of opening and closing; and a dressing determination device configured to determine a quality of a shaping process applied to an electrode of the electrode pair, wherein the dressing determination device comprises a visual sensor configured to obtain an image of the electrode, the visual sensor capable of identifying a base and a tip of the electrode on the image and measuring a distance between the base and the tip on the image, by image processing; a visual sensor control section configured to allow the visual sensor to measure the distance immediately before and after the shaping process is performed; a cut amount calculation section configured to calculate a difference between the distance measured by the visual sensor immediately before the shaping process is performed and the distance measured by the visual sensor immediately after the shaping process is performed, as a cut amount of the electrode; and a cut amount judgment section configured to judge whether the cut amount calculated by the cut amount calculation section is within a predetermined acceptable range or not.

According to the spot welding system described above, it is not necessary to tentatively strike the electrodes against each other for the determination of the quality of the shaping process, and therefore, a quality determination operation can be simplified. Further, the cut amount of the electrode is determined directly based on the image of the electrode, and therefore, even when a driving mechanism of the electrode is subjected to disturbances, such as vibration, or the system involves an error factor, such as the deviation of the attachment position of the electrode with respect to the welding gun, it can be accurately judged whether the cut amount is within the predetermined acceptable range or not. As a result, the reliability of the quality determination results of the shaping process of the electrode can be improved, and a poor weld caused by using a poorly shaped electrode can be surely prevented.

The present invention provides, as another aspect, a dressing determination method for determining a quality of a shaping process applied to an electrode of an electrode pair provided in a welding gun, the electrode pair capable of opening and closing, comprising obtaining an image of the electrodes immediately before the shaping process is performed, and identifying a base and a tip of the electrode on the image and measuring a distance between the base and the tip on the image, by image processing; obtaining an image of the electrodes immediately after the shaping process is performed, and identifying a base and a tip of the electrode on the image and measuring a distance between the base and the tip on the image, by image processing; calculating a difference between the distance measured immediately before the shaping process is performed and the distance measured immediately after the shaping process is performed, as a cut amount of the electrode; and judging whether the cut amount is within a predetermined acceptable range or not.

According to the dressing determination method described above, it is not necessary to tentatively strike the electrodes against each other for the determination of the quality of the shaping process, and therefore, a quality determination operation can be simplified. Further, the cut amount of the electrode is determined directly based on the image of the electrode, and therefore, even when a driving mechanism of the electrode is subjected to disturbances, such as vibration, or the system involves an error factor, such as the deviation of the attachment position of the electrode with respect to the welding gun, it can be accurately judged whether the cut amount is within the predetermined acceptable range or not. As a result, the reliability of the quality determination results of the shaping process of the electrode can be improved, and a poor weld caused by using a poorly shaped electrode can be surely prevented.

BRIEF DESCRIPTION OF THE DRAWINGS

The objects, features and advantages of the present invention will become more apparent from the following description of the preferred embodiments in connection with the accompanying drawings, wherein.

DETAILED DESCRIPTION

Figure 1:
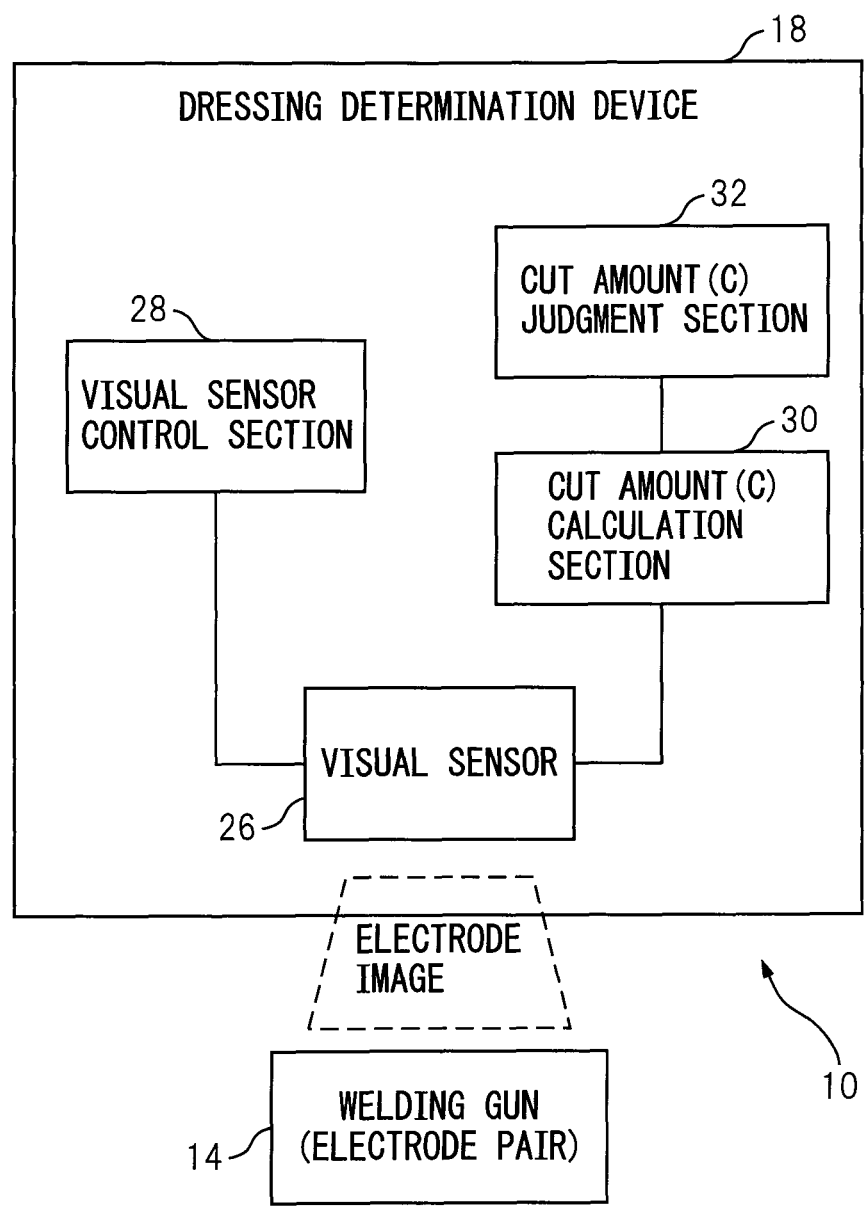
FIG. 1 is a functional block diagram depicting a configuration of a spot welding system according to an embodiment of the present invention.

The embodiments of the present invention are described below, in detail, with reference to the accompanying drawings. In the drawings, same or similar components are denoted by common reference numerals.

Figure 2:
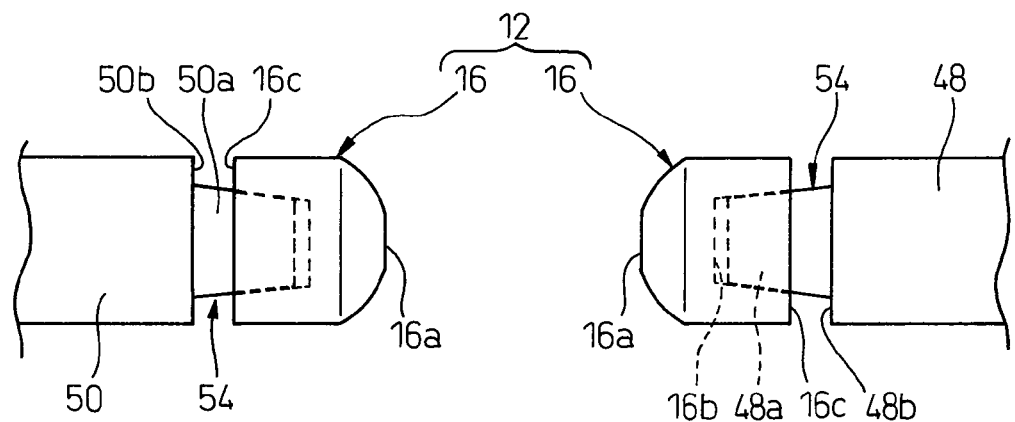
FIG. 2 is a diagram schematically depicting an electrode pair of a welding gun in the spot welding system of FIG. 1.
Figure 3:
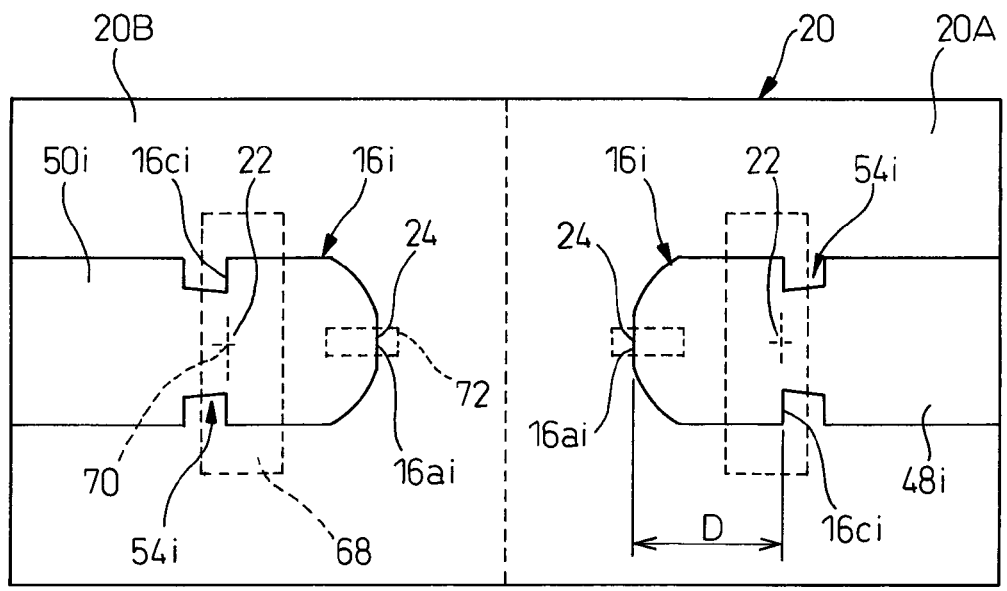
FIG. 3 is a diagram depicting an image obtained by a visual sensor in the spot welding system of FIG. 1.

Referring to the drawings, FIG. 1 is a functional block diagram depicting a configuration of a spot welding system 10 according to an embodiment of the present invention, FIG. 2 is a diagram schematically depicting an electrode pair of a welding gun in the spot welding system 10, and FIG. 3 is a diagram depicting an image obtained by a visual sensor in the spot welding system 10.

The spot welding system 10 performs a spot welding, a kind of a resistance welding technique, on a plurality of workpieces to be welded (not depicted; hereinafter referred to as objective workpieces) that are superimposed on each other. The spot welding system 10 includes a welding gun 14 provided with an electrode pair 12 capable of opening and closing; and a dressing determination device 18 configured to determine the quality of a shaping or forming process (i.e., dressing) applied to an electrode 16 of the electrode pair 12 (FIGS. 1 and 2). The dressing determination device 18 includes a visual sensor 26 configured to obtain an image 20 (FIG. 3) of the electrode 16, the visual sensor 26 capable of identifying a base 22 and a tip 24 of the electrode 16 on the image 20 and measuring a distance D between the base 22 and the tip 24 on the image 20, by image processing; a visual sensor control section 28 configured to allow the visual sensor 26 to measure the distance D immediately before and after the shaping process is performed; a cut amount calculation section 30 configured to calculate a difference between the distance D measured by the visual sensor 26 immediately before the shaping process is performed and the distance D measured by the visual sensor 26 immediately after the shaping process is performed, as a cut amount C of the electrode 16; and a cut amount judgment section 32 configured to judge whether the cut amount C calculated by the cut amount calculation section 30 is within a predetermined acceptable range or not.

In the spot welding system 10, several objective workpieces superimposed on each other are held between at least one pair of electrodes 16 provided in the welding gun 14, and the held point of the objective workpieces is subjected to a predetermined current fed from the electrodes 16 for a predetermined time period while being subjected to a predetermined pressing force applied by the electrodes 16, so that a welded portion of a desired quality can be obtained. Further, in the spot welding system 10, with respect to at least one electrode pair 12 provided in the welding gun 14, the shaping process for restoring the surface of each electrode 16 worn or deformed due to the repetition of a spot welding process to a proper shape can be performed at required periods by a suitable cutting or machining device (typically referred to as a tip dresser). Then, the dressing determination device 18 can determine the quality of the shaping process applied to each electrode 16 of the welding gun 14.

As described above, the spot welding system 10 has a configuration in which the visual sensor 26 performs the image processing on the obtained image 20 of the electrode 16 and thereby measures the distance D between the base 22 and the tip 24 of the electrode 16, the cut amount calculation section 30 calculates the difference, as the cut amount C, between the distance D measured immediately before the shaping process is performed and the distance D measured immediately after the shaping process is performed, and the cut amount judgment section 32 judges whether the cut amount C is within the predetermined acceptable range or not. According to this configuration, it is not necessary to tentatively strike the electrodes 16 against each other for the determination of the quality of the shaping process, and therefore, a quality determination operation can be simplified. Further, the cut amount C of the electrode 16 is determined directly based on the image 20 of the electrode 16, and therefore, even when a driving mechanism of the electrode 16 is subjected to disturbances, such as vibration, or the system involves an error factor, such as the deviation of the attachment position of the electrode 16 with respect to the welding gun 14, it can be accurately judged whether the cut amount C is within the predetermined acceptable range or not. As a result, the reliability of the quality determination results of the shaping process of the electrode 16 can be improved, and a poor weld caused by using a poorly shaped electrode 16 can be surely prevented.

In the case where the spot welding system 10 is applied to, e.g., an automobile assembly process, a robot system configured such that the welding gun 14 as a working tool (i.e., an end effecter) is attached to the distal end of an arm structure (i.e., a manipulator) of an industrial robot (hereinafter simply referred to as a robot) having, e.g., an articulated configuration, may be adopted, in order to quickly and accurately weld a plurality of joining points on objective workpieces while coping with the various positions and orientations of the joining points. Alternatively, if objective workpieces are relatively small in dimensions, a system configuration in which a robot holds the objective workpieces by a hand and variously moves with respect to the stationary welding gun 14, and thereby locates a plurality of joining points sequentially at a position predetermined for a welding operation, may be adopted.

Figure 4:
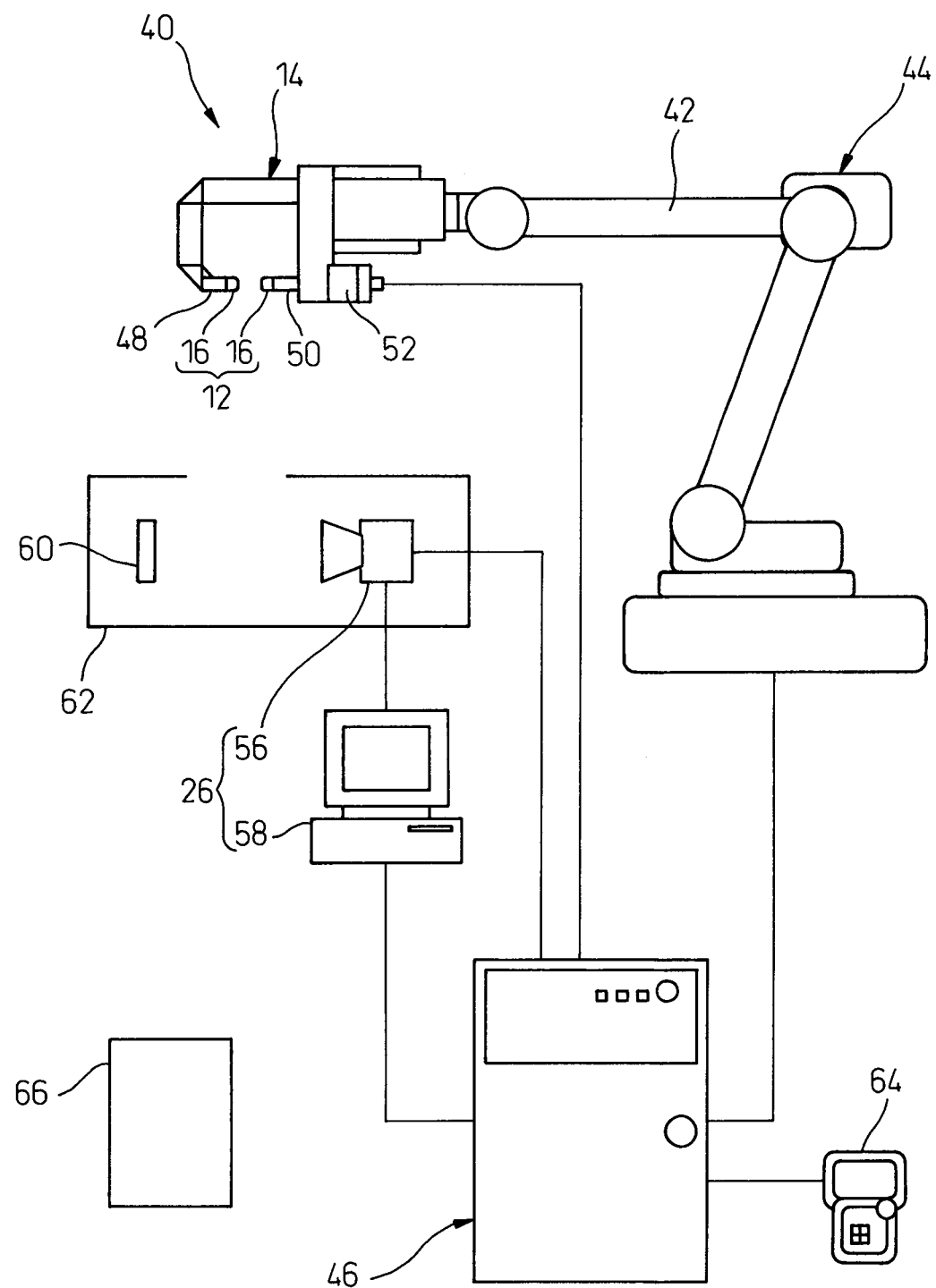
FIG. 4 is a diagram schematically depicting a robot system according to an embodiment of the present invention, to which the spot welding system of FIG. 1 can be applied.

FIG. 4 depicts a robot system 40 according to an embodiment of the present invention, to which the spot welding system 10 can be applied. The robot system 40 includes the aforementioned welding gun 14 and dressing determination device 18; a robot 44 configured to carry the welding gun 14 at the distal end of an articulated arm structure 42 and operates to change the relative position and orientation of the welding gun 14 and the objective workpieces (not depicted); and a robot controller 46 configured to control the robot 44.

The welding gun 14 is provided with, as the electrode pair 12, a fixed side (a left side in the drawing) electrode 16 disposed at the distal end of a fixed shaft part 48, and a movable side (a right side in the drawing) electrode 16 disposed at the distal end of a movable shaft part 50, the movable side electrode 16 capable of operating to open and close with respect to the fixed side electrode 16. Further, the welding gun 14 includes a servo motor 52, as a driving source of the movable side electrode 16, for driving the movable shaft part 50 to reciprocate in an axial direction. The controller of the welding gun 14 may be configured as one of the functions of the robot controller 46. In this configuration, the robot controller 46 may control the servo motor 52 and a power supply circuit of the electrode pair 12, so as to make the movable side electrode 16 operate to open or close with respect to the fixed side electrode 16 at a suitable velocity and make the electrode pair perform the spot welding to the objective workpieces. The welding gun 14 may be provided with not only one pair of electrodes 12 but also several pairs of electrodes 12.

As depicted in FIG. 2, truncated-conical joint projections 48a, 50a are provided respectively at the distal ends of the fixed and movable shaft parts 48, 50, at which the electrodes 16 are disposed. Each electrode 16 is provided at one (or first) axial end with a welding-operative surface 16a against which the objective workpiece abuts, and a joint recess 16b formed at a side opposite to the welding-operative surface 16a and capable of complementarily receiving the joint projection 48a, 50a of each shaft part 48, 50. Each electrode 16 is fixed to each shaft part 48, 50 with the joint recess 16b receiving therein, and joined to, the joint projection 48a, 50a of the corresponding shaft part 48, 50. In a properly fixed state, an annular groove 54 is defined between another (or second) axial end surface 16c adjacent to the joint recess 16b of each electrode 16 and an axial end surface 48b, 50b adjacent to the joint projection 48a, 50a of each shaft part 48, 50.

The visual sensor 26 of the dressing determination device 18 includes an imaging section (hereinafter referred to as a camera) 56 such as a CCD camera; and an image processing section 58 configured to perform image processing in connection with image data captured by the camera 56. The camera 56 may be accommodated in a soil-resistant cover 62 together with an illumination 60 for illuminating an object. In this arrangement, the robot 44 may operate to insert the welding gun 14 into the cover 62 by the motion of the arm structure 42 and dispose the electrodes 16 in the visual field of the camera 56.

The visual sensor control section 28, the cut amount calculation section 30 and the cut amount judgment section 32 of the dressing determination device 18 may be configured as one of the functions of the robot controller 46. In this configuration, the robot controller 46 can control the camera 56 to obtain the image 20 (FIG. 3) of the electrodes 16 immediately before and after the shaping process is performed, and control the image processing section 58 to identify the base 22 and the tip 24 of the electrode 16 on the image 20 and measure the distance D (FIG. 3) between the base 22 and the tip 24 on the image 20. Further, the robot controller 46 can calculate the difference between the distance D measured by the visual sensor 26 immediately before the shaping process is performed and the distance D measured by the visual sensor 26 immediately after the shaping process is performed, as the cut amount C of the electrode 16, and judge whether the cut amount C is within a predetermined acceptable range or not. According to this configuration, there is an advantage that a single robot controller 46 can control the operations of the welding gun 14, the visual sensor 26 and the robot 44 in an integrated manner, and thereby the system configuration can be simplified.

The robot system 40 may include a teach pendant 64 connected to the robot controller 46, or other peripheral devices (not depicted). A tip dresser 66 may be provided in an operational space of the robot 44. The tip dresser 66 may have publicly-known various configurations, such as a motor-driven type, a non-powered type, etc. A hand-held tip dresser may also be used for performing an electrode shaping process.

The robot system 40 may have another system configuration, instead of the configuration described above, in which the robot 44 holds the objective workpieces by a hand (not depicted) and variously moves with respect to the welding gun 14 fixedly disposed in the operational space of the robot 44, and thereby locates a plurality of joining points on the objective workpieces sequentially at a position predetermined for a welding operation. In either robot system 40, the provision of the robot 44 makes it possible to more quickly and accurately perform the welding process and achieve a labor saving in a welding line.

Figure 5:
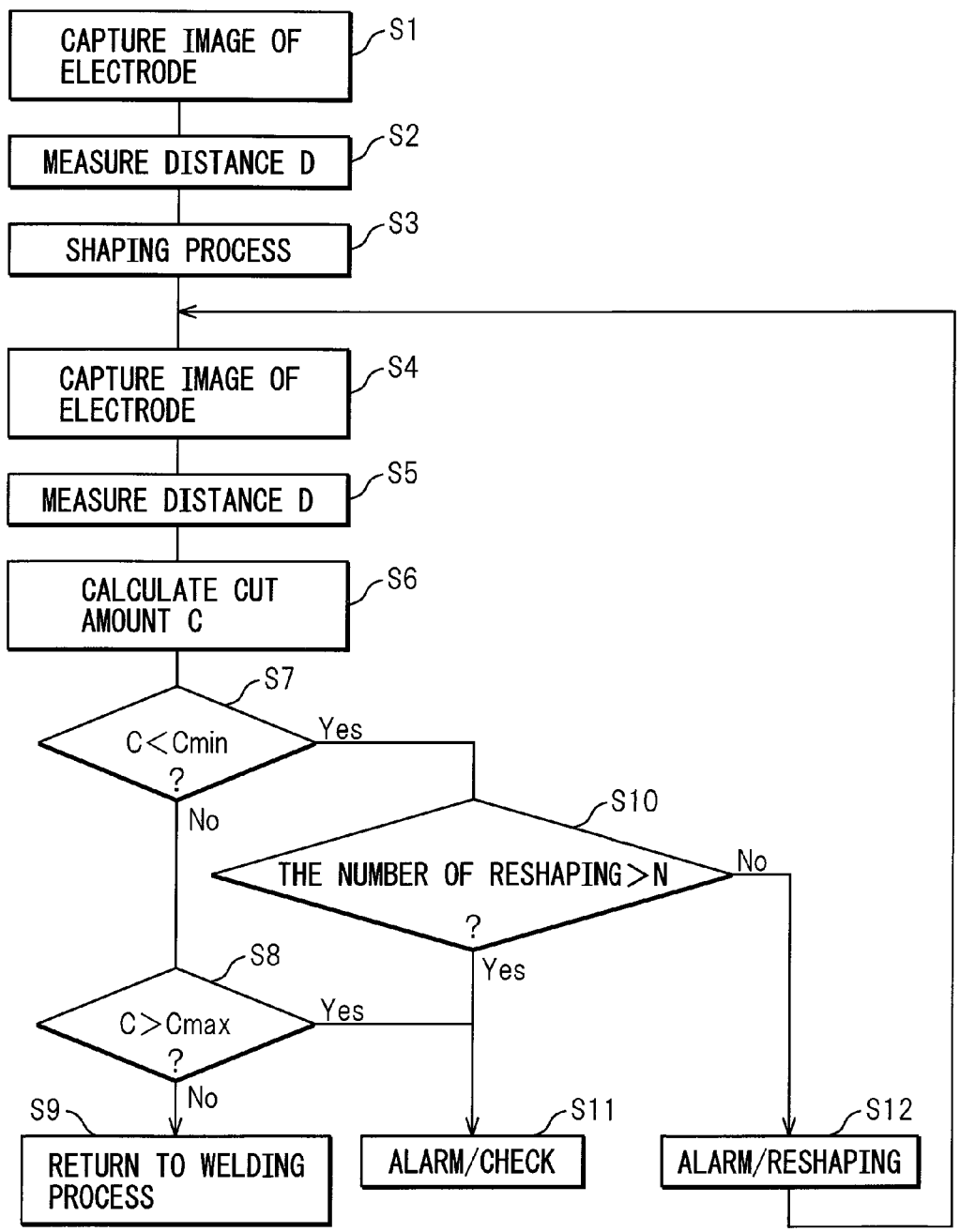
FIG. 5 is a flowchart depicting a dressing determination method according to an embodiment of the present invention.

A dressing determination method according to an embodiment of the present invention, which can be performed in the robot system 40, will be described below with reference to a flowchart of FIG. 5 and again to FIGS. 2-4.

When the robot 44 performs the spot welding on the objective workpieces and once the number of welding operations (i.e., pressurization and power distribution) by the electrode pairs 12 of the welding gun 14 reaches a predetermined value, the robot 44 suspends or finishes the welding process, inserts the welding gun 14 into the cover 62 by the motion of the arm structure 42, and disposes the pair of electrodes 16 in the predetermined visual field of the camera 56. In this state, the camera 56 captures an image of objects including the electrodes 16 inside the visual field and obtains an image (a two-dimensional image) 20 of the electrodes 16 and the tip areas of the corresponding shaft parts 48, 50 (step S1). When the camera 56 captures the objects, the illumination 60 may illuminate the electrodes 16 and their circumference from the rear side of the electrodes 16 in a direction opposite to the direction of a visual line of the camera 56, or alternatively, may illuminate the electrodes 16 and their circumference from the front side of the electrodes 16 in a direction approximated to the direction of a visual line of the camera 56.

The image processing section 58 performs image processing in connection with the two-dimensional image 20 captured by the camera 56, as follows, and measures the distance D between the base 22 and the tip 24 of the electrode 16 on the two-dimensional image 20 (step S2).

First, in the entire image 20 corresponding to the visual field of the camera 56, a search area 20A including an image 16i of the movable side (right side in the drawing) electrode 16 and a search area 20B including an image 16i of the fixed side (left side in the figure) electrode 16 are defined. Next, in each search area 20A, 20B, an image 54i of the annular groove 54 defined between the second axial end surface 16c of each electrode 16 and the axial end surface 48b, 50b of each shaft part 48, 50 is identified or discriminated by a feature recognition technique, such as edge extraction, pattern matching, etc. In this connection, the image 54i of the groove 54 is recognized as a pair of concave parts, locally existing at a pair of upper and lower edge portions vertically opposite to each other in the drawing, in the image 16i of the electrode 16 and the image 48i, 50i of the shaft part 48, 50. Thus, by previously defining a groove discrimination area 68 having dimensions and a profile as to enable a pair of upper and lower concave parts (i.e., the image 54i) to be embraced therein, and suitably shifting the groove discrimination area 68 so as to scan the entire search area 20A, 20B, the image 54i can be discriminated inside the groove discrimination area 68. A reference pattern of the pair of upper and lower concave parts (i.e., the image 54i), which is used for a matching in the feature recognition, may be previously obtained and stored as an image of the groove 54 in a state where an unused electrode 16 is properly mounted on each shaft part 48, 50.

Next, based on the image 54i of the groove 54 identified or discriminated in each search area 20A, 20B, the base 22 of each electrode 16 is identified in the image 16i. For example, a point 70 equidistant from the pair of upper and lower concave parts representing the image 54i of the groove 54 and located on a segment interconnecting the images 16ci of parts of the second axial end surface 16c of the electrode 16, which are identified or discriminated as a pair of upper and lower edge parts in the image 54i, may be identified as the base 22. At this time, by the aforementioned feature recognition performed on the image 54i, the position and orientation (or rotational angle) of the base 22 can also be obtained. A point to be identified as the base 22 in the image 16i is not limited to the aforementioned point 70, but may be any one of other points at various locations, provided that such a point is located so as not to be damaged or otherwise affected by the welding on the outer surface of the electrode 16.

Next, in each search area 20A, 20B, based on the position and rotational angle of the base 22 identified in the image 16i of each electrode 16, an image 16ai of the welding-operative surface 16a at the first axial end of each electrode 16 is identified or discriminated by a feature recognition technique, such as edge extraction, pattern matching, etc. In this connection, the image 16ai of the welding-operative surface 16a is recognized as a straight edge part, vertically extending at a left or right end in the drawing, in the image 16i of the electrode 16. Thus, by previously defining a working surface discrimination area 72 having dimensions and a profile as to enable the straight edge part (i.e., the image 16ai) to be embraced therein, and locating the working surface discrimination area 72 at a site defining a predetermined positional and orientational relationship with respect to the base 22 whose position and orientation have already been identified, the image 16ai can be discriminated inside the working surface discrimination area 72. In this configuration, the working surface discrimination area 72 is defined so as to be automatically located under the positional and orientational relationship predetermined with respect to the base 22 and to assume that the straight edge part discriminated therein represents the image 16ai of the welding-operative surface 16a, according to the position and orientation of the base 22 when the base 22 is identified in the image 16i of the electrode 16, so that the working surface discrimination area 72 may be relatively narrow, in particular, in a vertical direction in the drawing. Dimensions of the working surface discrimination area 72 in a horizontal direction in the drawing is set so as to enable the image 16ai of the welding-operative surface 16a to be embraced therein, even when the welding-operative surface 16a of the electrode 16 is subjected to the shaping process up to a critical cut amount. A reference pattern of the straight edge part (i.e., the image 16ai), which is used for a matching in the feature recognition, may be previously obtained and stored as an image of the welding-operative surface 16a of an unused electrode 16.

Next, based on the image 16ai of the welding-operative surface 16a identified or discriminated in each search area 20A, 20B, the tip 24 of each electrode 16 is identified in the image 16i. For example, a center point of the image 16ai of the welding-operative surface 16a may be identified as the tip 24. Alternatively, a point farthest away from the base 22 in the image 16ai of the welding-operative surface 16a may be identified as the tip 24.

Next, in each search area 20A, 20B, the distance D is measured as a shortest distance between the base 22 and the tip 24, both identified in the image 16i of each electrode 16. The distance D thus measured is a linear mapping of a two-dimensional projected distance between the welding-operative surface 16a and the axial second end surface 16c of the actual electrode 16. In this manner, the image processing section 58 obtains the distance D between the base 22 and the tip 24 of each electrode 16 before the shaping process is performed, on the two-dimensional image 20 captured by the camera 56 (step S2).

Once the distance D between the base 22 and the tip 24 of each electrode 16 before the shaping process is performed is measured, the robot 44 operates to draw the welding gun 14 out of the cover 62 by the motion of the arm structure 42 and dispose the pair of electrodes 16 of the welding gun 14 at a working position for the shaping process predetermined in the tip dresser 66. In this state, the tip dresser 66 performs the shaping process for the welding-operative surfaces 16a of the electrodes 16 by predetermined cut amounts (step S3).

Once the shaping process of the electrodes 16 is completed, the robot 44 again operates to insert the welding gun 14 into the cover 62 by the motion of the arm structure 42 and dispose the pair of electrodes 16 in the predetermined visual field of the camera 56. Then, similarly to step S1, the camera 56 captures the objects including the electrodes 16 inside the visual field (step S4) and, similarly to step S2, the image processing section 58 measures the distance D between the base 22 and the tip 24 of each electrode 16 on the two-dimensional image 20 (Step S5).

Once the distance D between the base 22 and the tip 24 of each electrode 16 after the shaping process is performed is measured, the cut amount calculation section 30, as one function of the robot controller 46, calculates, with respect to each electrode 16, a difference between the distance D measured before the shaping process is performed and the distance D measured after the shaping process is performed, as the cut amount C of the electrode 16 (step S6). Next, the cut amount judgment section 32, as one function of the robot controller 46, judges, with respect to each electrode 16, whether the cut amount C is within a predetermined acceptable range or not, in a manner as described below. The acceptable range of the cut amount C may be previously determined as a numerical range representing the normal operation of the tip dresser 66, based on experimentation or experimental rule, and is defined by using a lower limit value Cmin and an upper limit value Cmax of the cut amount C.

The cut amount judgment section 32 judges, with respect to each electrode 16, whether or not the cut amount C is less than the lower limit value Cmin (step S7). When it is judged that the cut amount C is not less than the lower limit value Cmin with respect to both electrodes 16, the cut amount judgment section 32 judges, with respect to each electrode 16, whether or not the cut amount C is more than the upper limit value Cmax (step S8). When it is judged that the cut amount C is not more than the upper limit value Cmax with respect to both electrodes 16, the cut amount judgment section 32 judges that the cut amount C is within the predetermined acceptable range, and thus the dressing determination flow is finished. Then, the robot 44 returns to the spot welding process, and resumes the spot welding process by using the welding gun 14 provided with the electrodes 16 after the shaping process is performed, or alternatively, waits for a new spot welding process (step S9). In this connection, the steps S7 and S8 may be performed in the reverse order.

When the cut amount judgment section 32 judges, in step S7, that the cut amount C is less than the lower limit value Cmin with respect to at lease one electrode 16, the cut amount judgment section 32 judges that the cut amount C of said electrode 16 is not within the predetermined acceptable range. Also, when the cut amount judgment section 32 judges, in step S8, that the cut amount C is more than the upper limit value Cmax with respect to at least one electrode 16, the cut amount judgment section 32 judges that the cut amount C of said electrode 16 is not within the predetermined acceptable range. If the cut amount judgment section 32 judges that the cut amount C of at least one electrode 16 is not within the predetermined acceptable range, the cut amount judgment section 32 may issue an alarm to an operator. In response to the alarm, the operator may check whether a structural malfunction of the tip dresser 66 or a false setting of the cut amount occurs or not, or may perform a reshaping process for said electrode 16.

For example, when the cut amount judgment section 32 judges that the cut amount C of at least one electrode 16 is less than the lower limit value Cmin, the cut amount judgment section 32 may judge whether the number of reshaping processes already performed for said electrode 16 is more than a predetermined threshold "N" or not (step S10). In this connection, the reshaping process of the electrodes 16 is performed considering that the insufficient cut amount C results from accidental malfunctions, such as adhesion of dust to a cutting blade of the tip dresser 66. Therefore, the threshold "N" of the number of reshaping processes may be previously determined as the number of times by which the accidental malfunctions can be eliminated, based on experimentation or experimental rule (e.g., N=1).

When the cut amount judgment section 32 judges, in step S10, that the number of reshaping processes for the electrode 16 is more than the threshold "N", the cut amount judgment section 32 may issue an alarm to an operator, so as to allow the operator to check whether a non-accidental structural malfunction of the tip dresser 66 or a false setting of the cut amount occurs or not (step S11). On the other hand, when it is judged that the number of reshaping process for the electrode 16 is less than the threshold "N", the cut amount judgment section 32 may issue an alarm to an operator, so as to allow the operator to further perform a reshaping process for said electrode 16 (step S12). After the reshaping process is performed in step S12, the process returns to step S4, and, in steps S5 to S10, the measurement of the distance D after the reshaping, the calculation of the cut amount (i.e., a total cut amount) C after the reshaping, and the judgment whether the cut amount C after the reshaping is within the acceptable range or not, are performed. Alternatively, after the reshaping process is performed in step S12, it may be judged, in a separate or additional flow, whether a difference between the distance D before the reshaping and the distance D after the reshaping (i.e., a cut amount by only the reshaping) is less than a predetermined lower limit value or not, and if the distance is judged as to be less than the lower limit value, an alarm may be issued to an operator, so as to allow the operator to check the tip dresser 66.

Also, when it is determined that the cut amount C of at least one electrode 16 is more than the upper limit value Cmax, the cut amount judgment section 32 may issue an alarm to an operator, so as to allow the operator to check whether a non-accidental structural malfunction of the tip dresser 66 or a false setting of the cut amount occurs or not (step S11).

According to the dressing determination method configured as described above, it is not necessary to tentatively strike the electrodes 16 against each other for the determination of the quality of the shaping process, and therefore, a quality determination operation can be simplified. Further, the cut amount C of the electrode 16 is determined directly based on the image 20 of the electrode 16 (more specifically, the image 16i), and therefore, even when a driving mechanism of the electrode 16 is subjected to disturbances, such as vibration, or the system involves an error factor, such as the deviation of the attachment position of the electrode 16 with respect to the welding gun 14, it can be accurately judged whether the cut amount C is within the predetermined acceptable range or not. As a result, the reliability of the quality determination results of the shaping process of the electrode 16 can be improved, and a poor weld caused by using a poorly shaped electrode 16 can be surely prevented.

The dressing determination method according to the present invention may be similarly implemented in a spot welding system not including a robot.

While the invention has been described with reference to specific preferred embodiments, it will be understood, by those skilled in the art, that various changes or modifications may be made thereto without departing from the scope of the following claims.

The invention claimed is:

1. A spot welding system comprising:
 a welding gun provided with an electrode pair capable of opening and closing; and
 a dressing determination device configured to determine a quality of a shaping process applied to an electrode of said electrode pair,
 wherein said dressing determination device comprises:
  a visual sensor configured to obtain an image of said electrode, said visual sensor configured to identify a base and a tip of said electrode on said image and measuring a distance between said base and said tip on said image, by image processing;
  a visual sensor control section configured to allow said visual sensor to measure said distance immediately before and after said shaping process is performed;
  a cut amount calculation section configured to calculate a difference between said distance measured by said visual sensor immediately before said shaping process is performed and said distance measured by said visual sensor immediately after said shaping process is performed, as a cut amount of said electrode; and
  a cut amount judgment section configured to judge whether said cut amount calculated by said cut amount calculation section is within a predetermined acceptable range or not, wherein
 said visual sensor is configured to obtain a position and an orientation of said base, based on said image of said electrode and an image of a shaft part on which said electrode is disposed, and identify said tip based on said position and said orientation.

2. The spot welding system of claim 1, wherein said cut amount judgment section issues an alarm when said cut amount judgment section judges that said cut amount is not within said acceptable range.

3. A dressing determination method for determining a quality of a shaping process applied to an electrode of an electrode pair provided in a welding gun, said electrode pair capable of opening and closing, comprising:
 obtaining an image of said electrodes immediately before said shaping process is performed, and identifying a base and a tip of said electrode on said image and measuring a distance between said base and said tip on said image, by image processing;
 obtaining an image of said electrodes immediately after said shaping process is performed, and identifying a base and a tip of said electrode on said image and measuring a distance between said base and said tip on said image, by image processing;
 calculating a difference between said distance measured immediately before said shaping process is performed and said distance measured immediately after said shaping process is performed, as a cut amount of said electrode;
 judging whether said cut amount is within a predetermined acceptable range or not; and
 obtaining a portion and an orientation of said base, based on said image of said electrode and an image of a shaft part on which said electrode is disposed, and identifying said tip based on said position and said orientation.

4. The dressing determination method of claim 3, further comprising issuing an alarm when it is judged that said cut amount is not within said acceptable range.

5. The dressing determination method of claim 3, further comprising reshaping said electrode when it is judged that said cut amount is less than a lower limit value defining said acceptable range, wherein, with respect to said electrode after being reshaped, the steps of measuring said distance, calculating said cut amount and judging said cut amount are performed.

* * * * *